(12) United States Patent
Wang et al.

(10) Patent No.: US 11,602,979 B2
(45) Date of Patent: Mar. 14, 2023

(54) SUN VISOR FOR A MOTOR VEHICLE (71) Applicant: DAIMAY NORTH AMERICA AUTOMOTIVE, INC, Redford, MI (US)

(72) Inventors: Jianhua Wang, Novi, MI (US); George F. Lambert, Fenton, MI (US); Prem Chand Katragadda, Farmington, MI (US)

(73) Assignee: DAIMAY NORTH AMERICA AUTOMOTIVE, INC., Redford, MI (US)

( * ) Notice: Subject to any disclaimer, the term of this patent is extended or adjusted under 35 U.S.C. 154(b) by 471 days.

(21) Appl. No.: 16/444,103

(22) Filed: Jun. 18, 2019

(65) Prior Publication Data

US 2019/0389282 A1   Dec. 26, 2019

Related U.S. Application Data

(60) Provisional application No. 62/788,374, filed on Jan. 4, 2019, provisional application No. 62/687,431, filed on Jun. 20, 2018.

(51) Int. Cl.
*B60J 3/02* (2006.01)
*B60R 1/00* (2022.01)
*B60J 3/04* (2006.01)
*B60K 35/00* (2006.01)

(52) U.S. Cl.
CPC .......... *B60J 3/0278* (2013.01); *B60J 3/0243* (2013.01); *B60J 3/0204* (2013.01); *B60J 3/0239* (2013.01); *B60J 3/04* (2013.01); *B60K 35/00* (2013.01); *B60K 2370/1438* (2019.05); *B60K 2370/152* (2019.05); *B60K 2370/1529* (2019.05); *B60K 2370/166* (2019.05); *B60K 2370/167* (2019.05); *B60K 2370/168* (2019.05); *B60K 2370/33* (2019.05); *B60K 2370/589* (2019.05); *B60K 2370/777* (2019.05); *B60R 1/00* (2013.01)

(58) Field of Classification Search
CPC . B60J 3/0278; B60J 3/0243; B60J 3/04; B60J 3/0204; B60J 3/0239; B60K 2370/143; B60K 2370/589; B60K 2370/777; B60K 2370/1529; B60K 2370/167; B60K 2370/168; B60K 2370/33; B60K 2370/152; B60K 2370/166; B60K 35/00; B60K 2370/1438; B60R 1/00
USPC ........................................................ 296/97.1
See application file for complete search history.

(56) References Cited

U.S. PATENT DOCUMENTS

| | | | | |
|---|---|---|---|---|
| 7,578,751 B2* | 8/2009 | Williams | ............... | A63B 60/02 473/329 |
| 8,960,761 B2* | 2/2015 | Newman | .................... | B60J 3/02 359/603 |
| 2009/0309384 A1* | 12/2009 | Huff | ....................... | B60J 3/0221 296/97.9 |
| 2017/0013188 A1* | 1/2017 | Kothari | .................... | B60R 1/00 |

(Continued)

*Primary Examiner* — D Glenn Dayoan
*Assistant Examiner* — Dana D Ivey
(74) *Attorney, Agent, or Firm* — Carlson, Gaskey & Olds, P.C.

(57) ABSTRACT

A sun visor assembly for a vehicle according to an exemplary aspect of the present disclosure includes, among other things, a visor having a transparent portion and a circuit configured to control at least one function of the visor. The visor is pivotable between a first position and a second position.

20 Claims, 8 Drawing Sheets

(56) References Cited

U.S. PATENT DOCUMENTS

2018/0170155 A1* 6/2018 Yu ........................ B60J 3/0273
2019/0232866 A1* 8/2019 Holland ................ H05B 47/11
2019/0322162 A1* 10/2019 Murase ................. G02F 1/163

* cited by examiner

SUN VISOR FOR A MOTOR VEHICLE

PRIORITY CLAIM

This application claims the benefit of U.S. Provisional Application No. 62/687,431 filed on Jun. 20, 2018 and U.S. Provisional No. 62/788,374 filed on Jan. 4, 2019.

TECHNICAL FIELD

This disclosure relates to a sun visor, and more particularly a sun visor near a windshield of a motor vehicle.

BACKGROUND

Some passenger vehicles include sun visors attached to a windshield or roof of a vehicle. Sun visors may be located at the driver and passenger seat, for example, and protect the driver and passenger from bright sunlight. Some known sun visors pivot to a stowed position when not in use, and may include a light and/or a vanity mirror.

SUMMARY

A sun visor assembly for a vehicle according to an exemplary aspect of the present disclosure includes, among other things, a visor having a transparent portion and a circuit configured to control at least one function of the visor. The visor is pivotable between a first position and a second position.

In a further embodiment, the circuit comprises a printed circuit on the transparent portion.

In a further embodiment, the circuit is configured to adjust a tint of the transparent portion.

In a further embodiment, the visor has a camera and a transparent screen on the transparent portion, the transparent screen configured to display an image of an occupant of the vehicle.

In a further embodiment, the visor has a light.

In a further embodiment, the visor has a housing along a top edge of the transparent portion.

In a further embodiment, the circuit is arranged within the housing.

In a further embodiment, the visor receives power from a vehicle.

In a further embodiment, the visor comprises a clip for attaching to a vehicle.

In a further embodiment, the transparent visor is a display and the circuit is configured to adjust a brightness of the display.

In a further embodiment, the transparent visor is configured to display information for an occupant of a vehicle.

In a further embodiment, the information is at least one of a time, speed limit, vehicle speed, navigation instruction, compass, and warning information.

In a further embodiment, the sun visor is in communication with a remote device.

In a further embodiment, the remote device is one of a vehicle information system and a mobile device.

In a further embodiment, the sun visor communicates with the remote device wirelessly.

A vehicle according to an exemplary aspect of the present disclosure includes, among other things, a seat, a window near the seat, and a visor mounted near the window and the seat. The visor has a transparent portion. The visor is pivotable between a first position and a second position. A circuit is configured to control at least one function of the visor.

In a further embodiment, the circuit is configured to adjust a tint of the transparent visor.

In a further embodiment, the transparent portion has an electronic mirror.

In a further embodiment, the transparent portion is configured to display information for an occupant of the seat.

In a further embodiment, the visor is configured to pivot about two axes.

DETAILED DESCRIPTION

Figure 1:
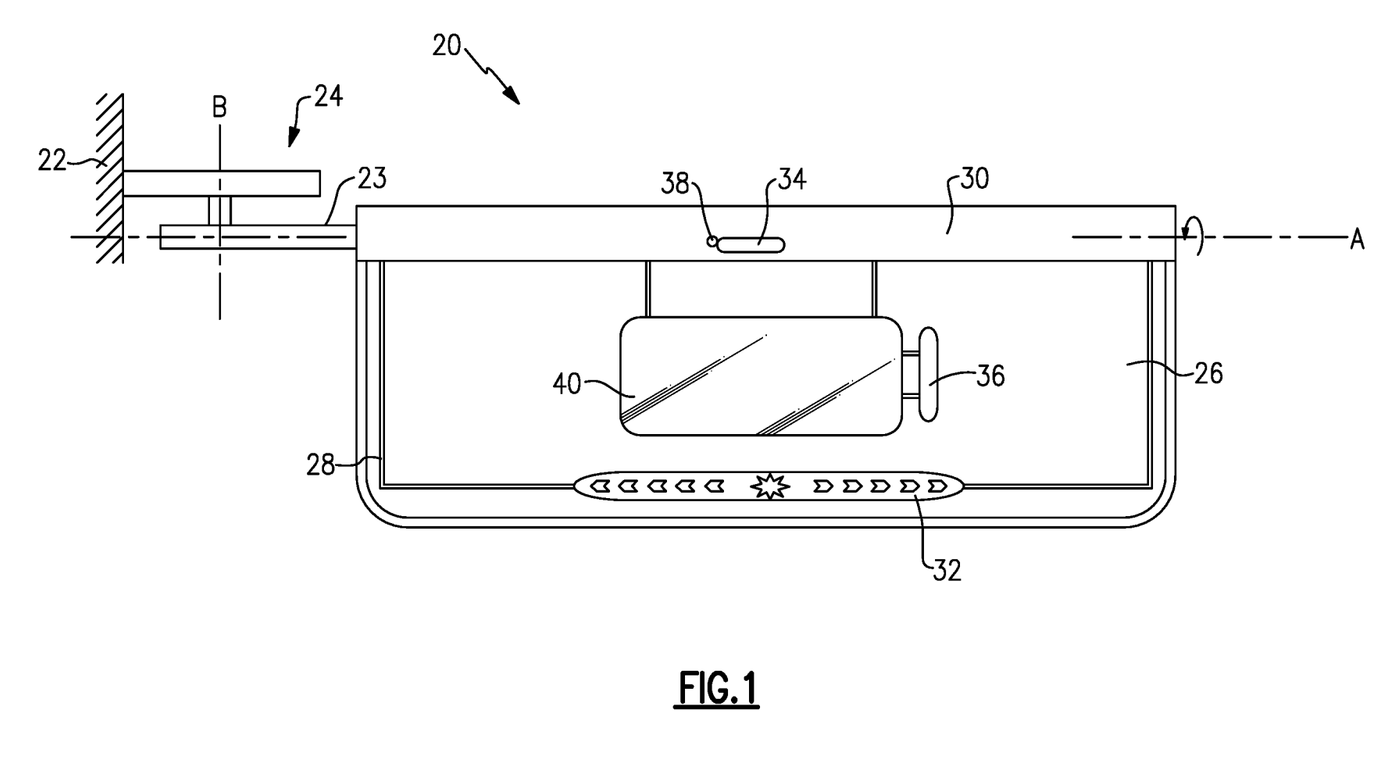
FIG. 1 illustrates an example sun visor assembly.

FIG. 1 illustrates an example sun visor assembly 20. In this example, the sun visor assembly 20 is mounted in a vehicle cabin 22 via a mount 24. The mount 24 may be attached to a corner of a windshield or roof of the vehicle cabin 22, for example. The sun visor assembly 20 may be mounted in the vehicle cabin 22 at the driver's side, passenger side, or both. In some examples, the sun visor assembly 20 may be mounted near a rear seat, or anywhere in the vehicle cabin 22 to display information.

The assembly 20 includes a visor 26 made of a tinted transparent material, such as an acrylic material. In one example, the visor 26 is tinted a gray shade to help block sunlight while still allowing the driver to see his or her surroundings. In other embodiments, the visor 26 may be tinted other shades, such as to match the interior of the vehicle, or for particular applications such as evening driving. The visor 26 may be generally rectangular in shape, and have a generally uniform thickness. The visor 26 may include a thicker perimeter extending about the visor 26. In one example, the perimeter is rounded, and has a radius of about 3.5 mm.

The visor 26 is movable between a stowed position and a deployed position. In the stowed position, the visor 26 is generally adjacent a roof of the vehicle, while in the deployed position, the visor 26 is generally adjacent a windshield of the vehicle. The visor 26 is attached to the mount 24 at a corner 23. In this example, the visor 26 moves between the stowed and deployed positions by pivoting about an axis A. The visor 26 may also move in a direction parallel to the axis A, to allow the driver of the vehicle to further adjust the visor 26. In some examples, the visor 26 is also pivotable about an axis B.

The visor 26 includes a printed circuit 28 and circuit housing 30. The printed circuit 28 may be embedded on the acrylic surface of the visor 26, and may provide several functions to the visor 26. In the illustrated example, the circuit housing 30 is arranged along a top edge of the visor 26. In other examples, it may be arranged along a different edge, such as a side edge.

The visor 26 may be tintable to adjust the amount of sunlight protection. For example, a driver may want the visor 26 darker on very bright days. The printed circuit 28 includes a dimmer switch 32. In the illustrated embodiment, the dimmer switch 32 is a touch slider. In this example, a driver may slide a finger along the switch 32 or touch a particular point along the dimmer switch 32 to adjust the visor 26 darker or lighter. In the illustrated example, the switch 32 is arranged along a bottom edge of the visor 26. In other examples, the switch 32 may be arranged along a top edge or side of the visor 26. The adjustable tint function may be mechanically implemented, or electronically implemented.

The visor 26 may be made with smart glass, such as that made by VG SMARTGLASS, LLC. In some embodiments, the tint of the visor 26 may automatically adjust based on an amount of sunlight detected. In this embodiment, the assembly 20 may include a light or temperature sensor, for example.

The visor 26 may include a light and electronic vanity "mirror." In one example, a light 34 is located on the circuit housing 30. The light 34 may be controlled via a switch, in one example. The visor 26 may include an "electronic mirror"—that is, a camera and screen. The driver may turn the "electronic mirror" on and off at a switch 36. In the illustrated example, the switch 36 is part of the printed circuit 28. However, in other embodiments, the switch 36 may be located on the circuit housing 30. A camera 38 is positioned to be facing the driver. When the driver switches the "electronic mirror" on, a transparent screen 40 displays the drivers face as captured by the camera 38. This allows the driver to see himself or herself on the screen in real time, as with a mirror. The screen 40 is transparent when it is off, so the driver can see through that portion of the visor 26 when the "electronic mirror" is not in use. In one embodiment, the transparent screen 40 is at least 140 mm long by 65 mm tall, though larger and smaller transparent screens are contemplated within the scope of this disclosure.

In one embodiment, the electronic components of the visor assembly 20 may be powered by a lithium battery. In other embodiments, the visor assembly 20 may receive power from the vehicle 22.

The National Highway Traffic and Safety Administration ("NHTSA") requires certain warning labels to be posted on sun visors in some vehicles. In one embodiment, the warning label may be displayed on the screen 40. In other embodiments, the warning label may be placed on the vehicle 22 near the visor assembly 20.

Figure 2:
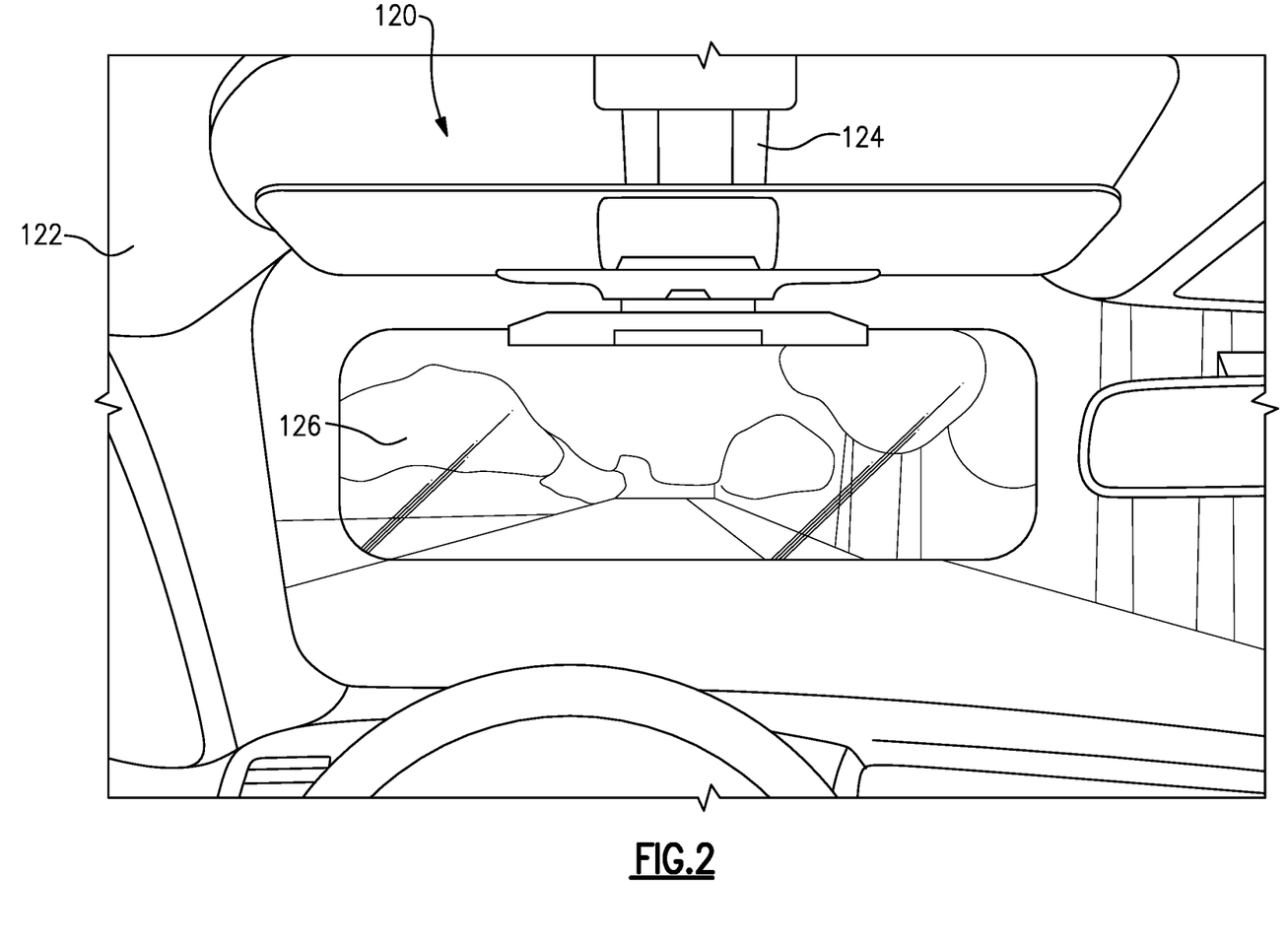
FIG. 2 illustrates another example sun visor assembly.

FIG. 2 illustrates another example sun visor assembly 120. In this example, the mount 124 allows the visor 126 to be attached to an existing vehicle. In this illustrated embodiment, the mount 124 is attached to the top edge of the visor 126 and is configured to clip onto an existing sun visor. In other embodiments, the mount 124 may be a suction cup configured to attach to a windshield or window of the vehicle 122. This assembly 120 may benefit from all of the various features disclosed above. This attachment of the assembly 120 to an existing vehicle may provide sun protection to the driver and/or passenger without impeding the view of the surroundings.

Figure 3:
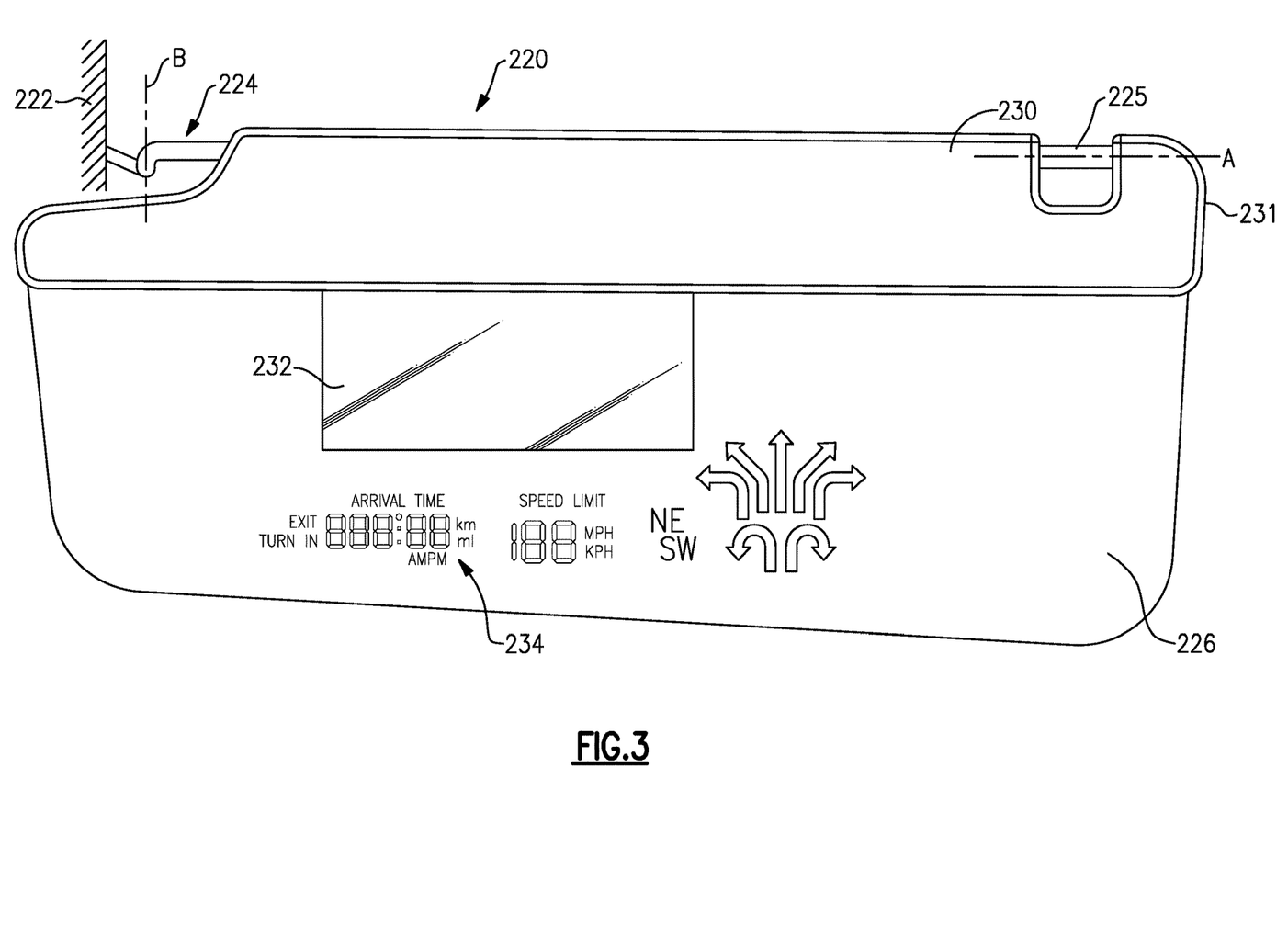
FIG. 3 illustrates another example sun visor assembly.

FIGS. 3-8 illustrate another example embodiment. FIG. 3 illustrates another example sun visor assembly 220. The sun visor assembly 220 is mounted in a vehicle cabin 222 via a mount 224. The mount 224 may be attached to a corner of a windshield or roof of the vehicle cabin 222, for example. The sun visor assembly 220 may be mounted in the vehicle cabin 222 at the driver's side, passenger side, or both.

The assembly 220 includes a visor 226 made of a tinted transparent material, such as an acrylic or glass material. In one example, the visor 226 is tinted a gray shade to help block sunlight while still allowing the driver to see his or her surroundings. In other embodiments, the visor 226 may be tinted other shades, such as to match the interior of the vehicle, or for particular applications such as evening driving. The visor 226 may be generally rectangular in shape, and have a generally uniform thickness.

The visor 226 is movable between a stowed position and a deployed position. In the stowed position, the visor 226 is generally adjacent a roof of the vehicle, while in the deployed position, the visor 226 is generally adjacent a windshield of the vehicle. In this example, the visor 226 moves between the stowed and deployed positions by pivoting about an axis A. The visor 226 may also move in a direction parallel to the axis A, to allow the driver of the vehicle to further adjust the visor 226. In some examples, the visor 226 is also pivotable about an axis B. Thus, the visor assembly 220 may rotate between stowed and deployed positions (about axis A), pivot to the side (about axis B), and/or slide (along axis A).

The assembly 220 includes a housing 230 containing electronic components for providing functions to the visor 226. In the illustrated example, the housing 230 is arranged along a top edge of the visor 226. In other examples, it may be arranged along a different edge, such as a side edge. The visor 226 may include an electronic mirror 232 and an information display 234. In some embodiments, the assembly 220 may include a light on the visor 226 or the housing 230. The housing 230 includes a printed circuit board 231 for controlling at least some of these visor functions. In an embodiment, the printed circuit board 231 is about 40 mm×40 mm. The functions of the visor 226 may be controlled via a switch, button, or touchpad, in one example. In an embodiment, the functions of the visor 226 may be controlled via a user input area 236 located in the housing 230.

In an embodiment, the mirror 232 is an "electronic mirror"—that is, a camera and screen. The driver may turn the "electronic mirror" on and off at a switch 236. In the illustrated example, the switch 36 is located in the housing 230. The assembly 220 may include a camera positioned to be facing the driver. When the driver switches the "electronic mirror" on, the electronic mirror 232 displays the drivers face as captured by the camera. This allows the driver to see himself or herself on the screen in real time, as with a mirror. The mirror display 232 is transparent when it is off, so the driver can see through that portion of the visor 226 when the "electronic mirror" is not in use. In one embodiment, the electronic mirror 232 is at least 140 mm long by 65 mm tall, though larger and smaller transparent screens are contemplated within the scope of this disclosure. The electronic mirror 232 may be fully translucent, or partially translucent. For example, the electronic mirror 232 may be switched between 100% translucent and 50% translucent when on.

Figure 4:
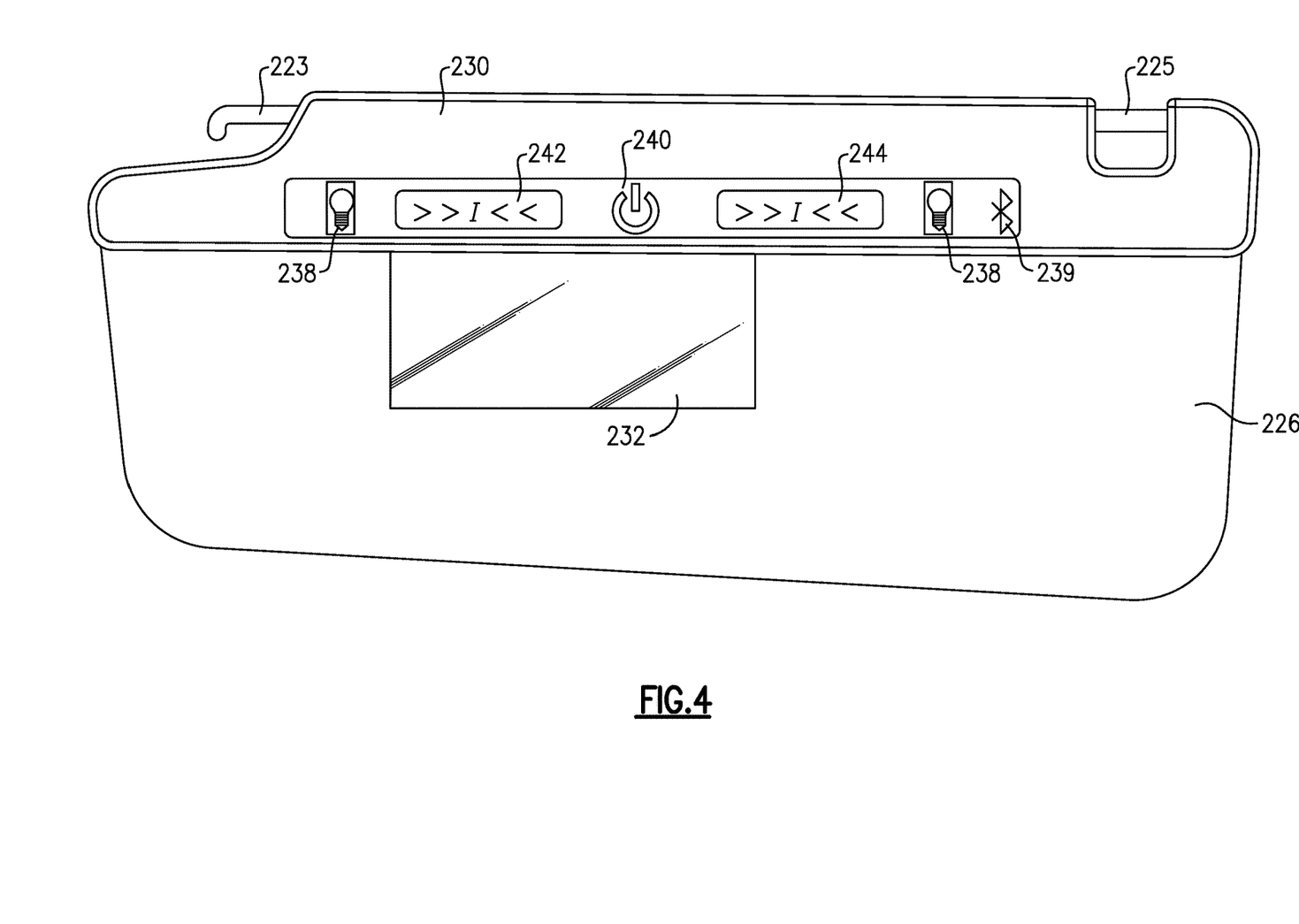
FIG. 4 illustrates another view of an example sun visor assembly.

Referring to FIG. 4, and with continuing reference to FIG. 3 the housing 230 may include several buttons, switches, and/or indicators. In the illustrated example, the housing 230 includes a light 238. The assembly 220 may include several lights 238. In other embodiments, a light 238 may be located on other portions of the assembly 220. The light 238 may be an LED light, for example. The housing 230 may also include an on/off switch 240. In an example, the switch 240 controls the lights 238 and the mirror 232.

The visor 226 may be tintable to adjust the amount of sunlight protection. For example, a driver may want the visor 226 darker on very bright days. The housing 230 may include a dimmer switch 242. In the illustrated embodiment, the dimmer switch 242 is a touch slider. In this example, a driver may slide a finger along the switch 242 or touch a particular point along the dimmer switch 242 to adjust the visor 226 darker or lighter. This adjustable tint function may be mechanically implemented, or electronically implemented.

The visor 226 may be made with smart glass, such as that made by VG SMARTGLASS, LLC. In some embodiments, the tint of the visor 226 may automatically adjust based on an amount of sunlight detected. In this embodiment, the assembly 220 may include a light or temperature sensor, for example. The visor 226 may also be adjustable via a translucent film on the entire visor 226.

The functions of the visor, such as the information display 234 may be adjustable. For example, the display 234 may be adjusted brighter or dimmer, depending on the amount of ambient light. The housing 230 may include a dimmer switch 244, such as a touch slider. In this example, a driver may slide a finger along the switch 244 or touch a particular point along the dimmer switch 244 to adjust the display 234 darker or lighter. The dimmer switches 242, 244 may be capacitive touch switches, for example.

In a further embodiment, the visor assembly 220 may connect through Bluetooth. An indicator 239 indicates whether the assembly 220 is connected. The functions of the visor assembly 220, such as dimming the display 234 or adjusting the tint of the visor 226 may be further controlled via the Bluetooth connection. In some embodiments, the visor assembly 220 may communicate with other devices within the vehicle via the Bluetooth connection. The visor assembly 220 may receive data from a vehicle information system in the vehicle cabin 222 and/or data from a mobile device, such as a smart phone. In one example, the visor assembly 220 communicates with the vehicle information system or mobile device via a Bluetooth connection.

Figure 5:
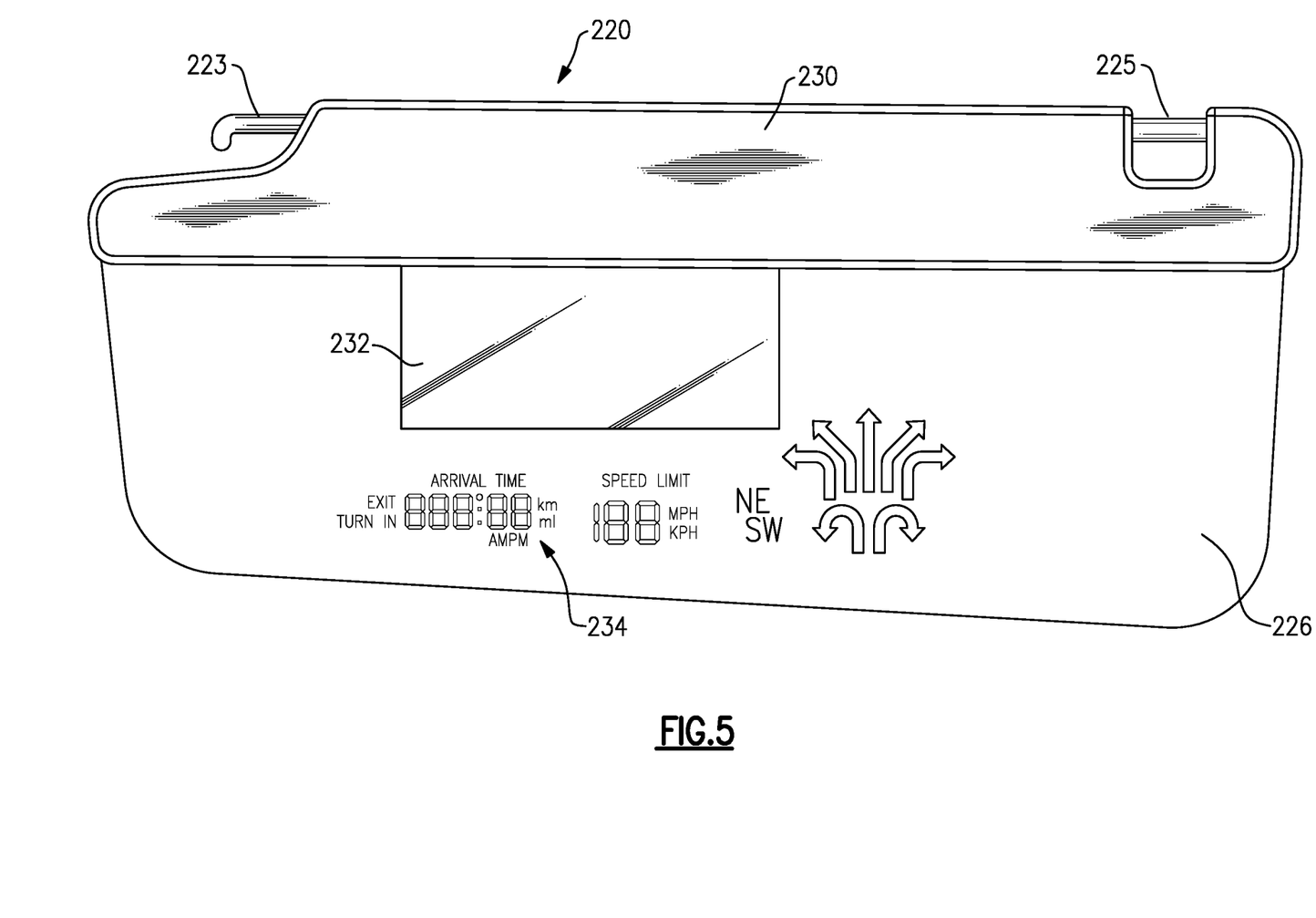
FIG. 5 illustrates another view of an example sun visor assembly.

Referring to FIG. 5, and with continuing reference to FIGS. 3-4, the information display 234 may display information to the driver. For example, the information display 234 may display information regarding navigation. The display 234 may display an expected arrival time and the next turn or exit, for example. The display 234 may also display the current time, a speed limit, the current vehicle speed, weather and/or GPS data, for example. The entire visor 226 is transparent, so the driver can see the road through the visor 226 and the information display 234. Thus, in some embodiments, the information display 234 may take up the entire visor 226, or only a portion of the visor 226. In an embodiment, the information that is displayed may be programmed as a variable based on the vehicle manufacturer's design and position.

Figure 6:
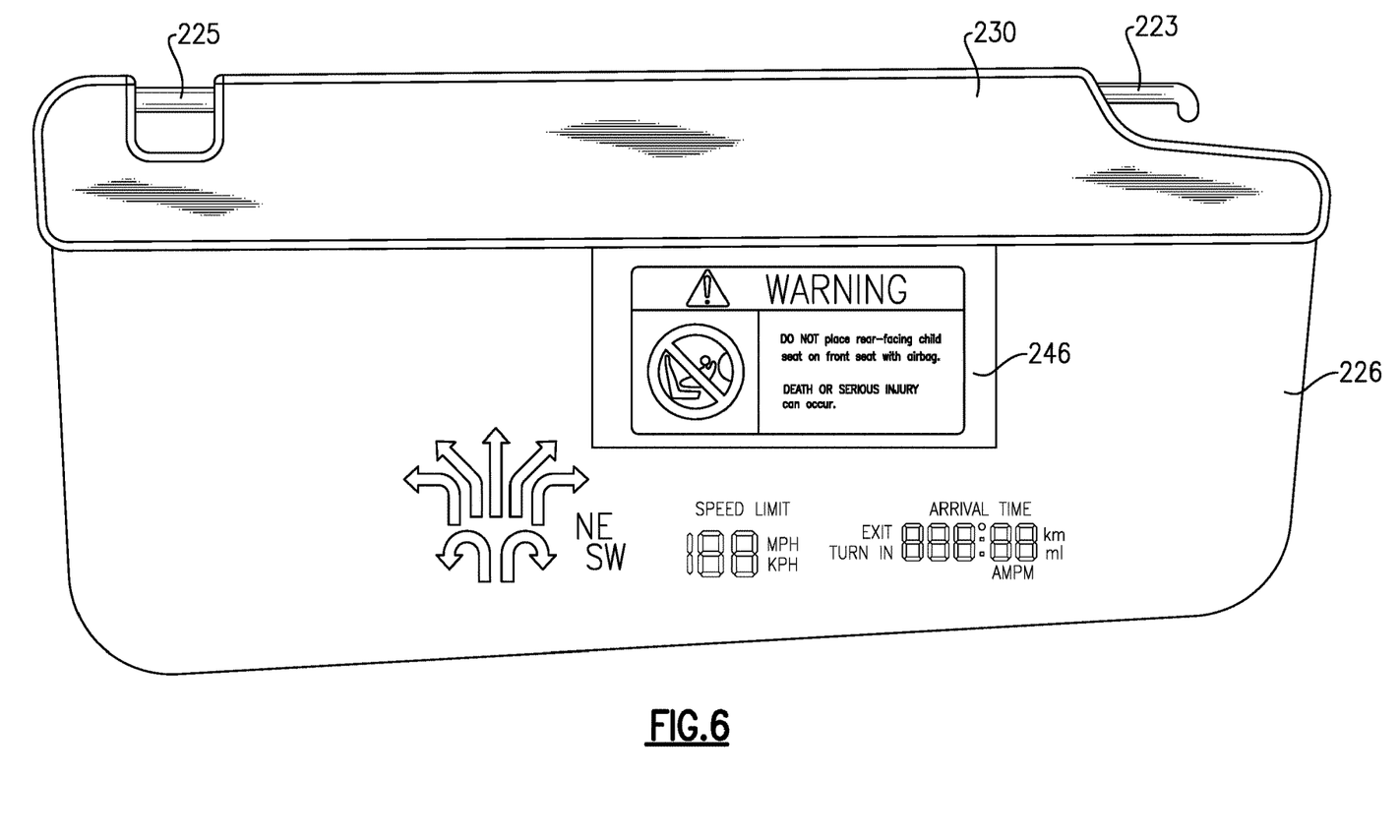
FIG. 6 illustrates another view of an example sun visor assembly.

The National Highway Traffic and Safety Administration ("NHTSA") requires certain warning labels to be posted on sun visors in some vehicles. As shown in FIG. 6, the warning label 246 may be an electronic warning label that is displayed on the visor 226. The warning label 246 may be displayed such that a driver of the vehicle 222 can view the warning label 246 when the visor 226 is in the stowed position. In other embodiments, the warning label 246 may be placed on the vehicle 222 near the visor assembly 220. The electronic warning label 246 may be turned on or off, or may turn on and off automatically.

Figures 7A, 7B:
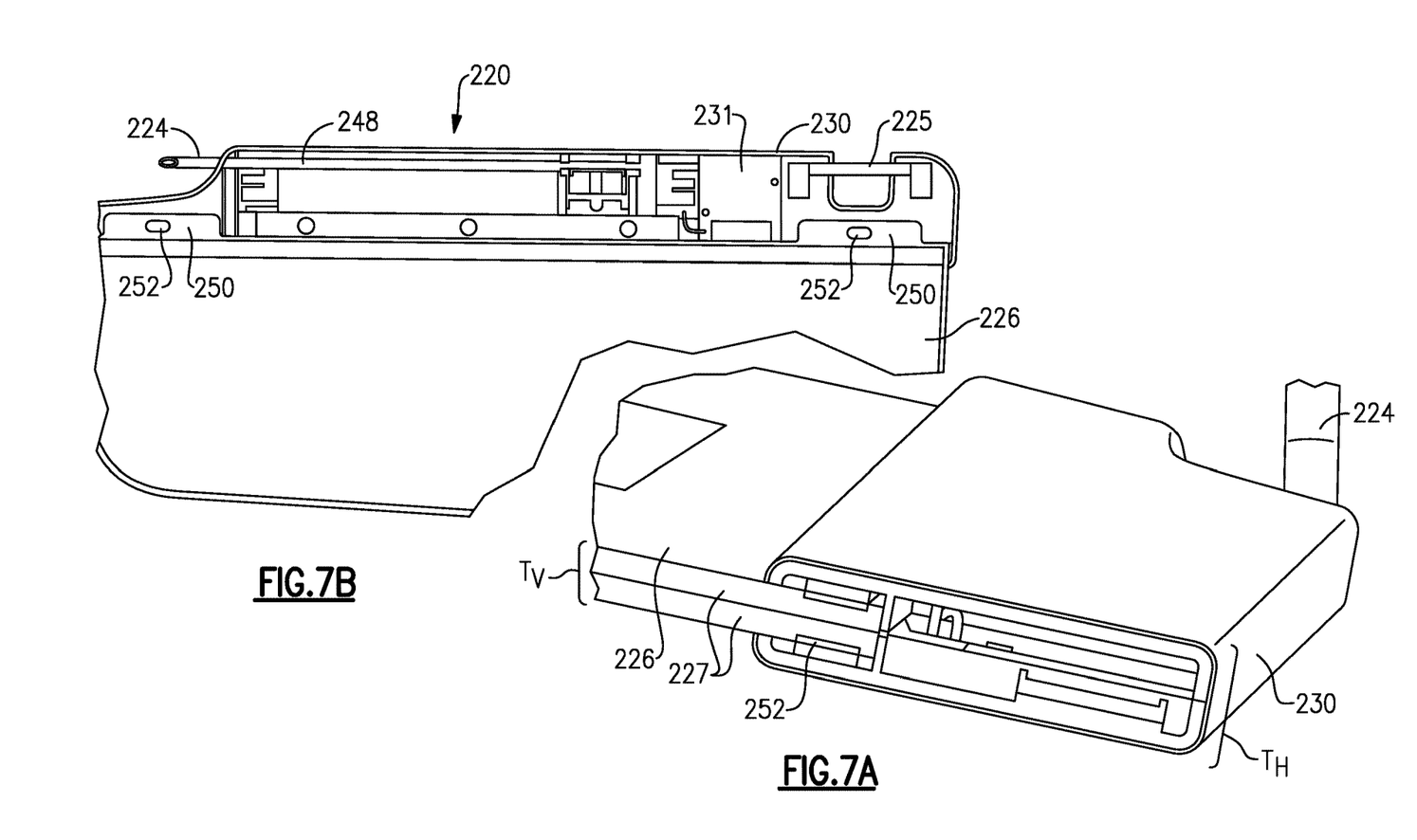
FIG. 7A illustrates a cross-sectional view of a portion of an example sun visor assembly.
FIG. 7B illustrates a portion of an example sun visor assembly.
Figure 8A:
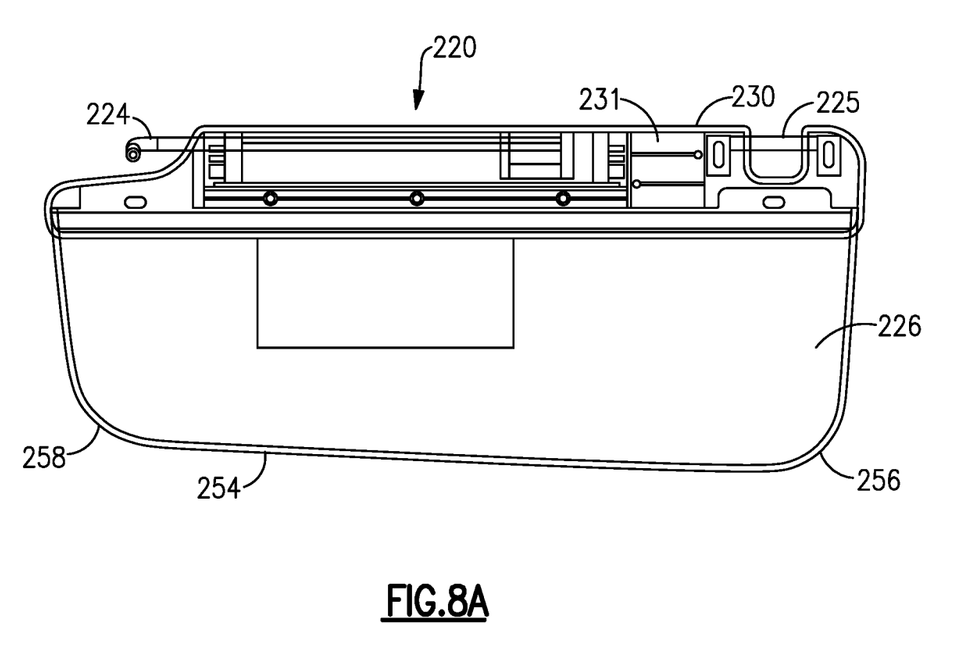
FIG. 8A illustrates another view of an example sun visor assembly.
Figure 8B:
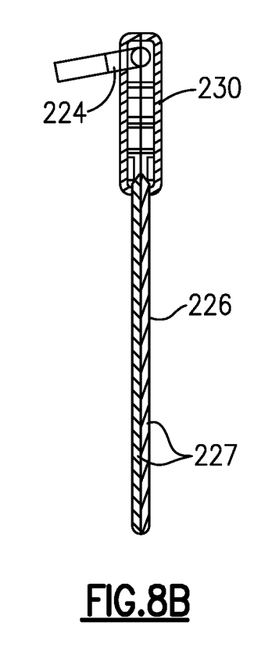
FIG. 8B illustrates a cross-sectional view of a portion of an example sun visor assembly.

FIGS. 7 and 8 illustrate the arrangement of the electronic components within the housing 230. In the illustrated embodiment, the assembly 220 receives power from the vehicle 222 through the mount 224. The mount 224 may include a telescoping rod 248, and the assembly 220 may receive 12 V power through the telescoping rod 248. In another embodiment, the electronic components of the visor assembly 220 may be powered by a lithium battery.

As shown in FIGS. 7A and 7B, the visor 226 may have a smaller thickness than the housing 230. In the illustrated embodiment, the visor 226 extends into the housing 230 for securement to the housing 230. The visor 226 may have one or more protrusions 250 with a hole 252 for securing to the housing 230. As shown in FIGS. 8A and 8B, the visor 226 may include a rounded edge about a perimeter 254 of the visor 226. The visor 226 may also have radiused corners 256, 258. In one embodiment, the corners 256, 258 have different radii. In another embodiment, the corners 256, 258 have the same radii.

Although the different embodiments are illustrated as having specific components, the embodiments of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure.

What is claimed is:

1. A sun visor assembly for a vehicle comprising:
a visor pivotable between a first position and a second position, the visor including a transparent portion extending a full thickness of the visor, the transparent portion including a transparent screen and outer portions surrounding the transparent screen such that the outer portions extend from the transparent screen towards lateral edges and a bottom edge of the visor;
a camera configured to capture an image of an occupant of the vehicle;
a circuit configured to control at least one function of the visor;
wherein the circuit is configured to adjust a tint of the transparent portion; and
wherein the circuit is configured to display the image of the occupant on the transparent screen.

2. The sun visor assembly of claim 1, wherein the circuit comprises a printed circuit on the transparent portion.

3. The sun visor assembly of claim 1, wherein the visor has a light.

4. The sun visor assembly of claim 1, wherein the visor has a housing along a top edge of the transparent portion.

5. The sun visor assembly of claim 4, wherein the circuit is arranged within the housing.

6. The sun visor assembly of claim 1, wherein the visor receives power from a vehicle.

7. The sun visor assembly of claim 1, wherein the visor comprises a clip for attaching to a vehicle.

8. The sun visor assembly of claim 1, wherein the transparent portion is a display and the circuit is configured to adjust a brightness of the display.

9. The sun visor assembly of claim 1, wherein the transparent portion is configured to display information for the occupant of the vehicle.

10. The sun visor assembly of claim 9, wherein the information is at least one of a time, speed limit, vehicle speed, navigation instruction, compass, and warning information.

11. The sun visor assembly of claim 1, wherein the tint of the transparent portion is adjustable via a dimmer switch.

12. The sun visor assembly of claim 9 wherein the sun visor is in communication with a remote device.

13. The sun visor assembly of claim 12, wherein the remote device is one of a vehicle information system and a mobile device.

14. The sun visor assembly of claim 12, wherein the sun visor communicates with the remote device wirelessly.

15. The sun visor assembly of claim 9, wherein the outer portions of the transparent portion include an information display, the circuit configured to display the information on the information display.

16. The sun visor assembly of claim 15, wherein the entire transparent portion is uniformly transparent and tinted when no image is displayed on the transparent screen and no information is displayed in the information display.

17. A vehicle, comprising:
a vehicle cabin;
a visor mounted in the vehicle cabin, the visor pivotable between a first position and a second position, the visor including a transparent portion extending a full thickness of the visor, the transparent portion including a transparent screen and outer portions surrounding the transparent screen such that the outer portions extend from the transparent screen towards lateral edges and a bottom edge of the visor;
a camera configured to capture an image of an occupant of the vehicle;
a circuit configured to control at least one function of the visor;
wherein the circuit is configured to adjust a tint of the transparent portion; and
wherein the circuit is configured to display the image of the occupant on the transparent screen.

18. The vehicle of claim 17, wherein the transparent portion is configured to display information for the occupant of the vehicle cabin.

19. The vehicle of claim 17, wherein the visor is configured to pivot about two axes.

20. The vehicle of claim 17, wherein the tint of the transparent portion is adjustable via a dimmer switch.

* * * * *